United States Patent
Lee et al.

(10) Patent No.: US 6,930,749 B2
(45) Date of Patent: Aug. 16, 2005

(54) METHOD FOR FORMING METAL LINE OF LIQUID CRYSTAL DISPLAY DEVICE

(75) Inventors: Hyung Chan Lee, Kumi-shi (KR); Beung Hwa Jeong, Kumi-shi (KR)

(73) Assignee: LG. Philips LCD Co., Ltd., Seoul (KR)

( * ) Notice: Subject to any disclaimer, the term of this patent is extended or adjusted under 35 U.S.C. 154(b) by 49 days.

(21) Appl. No.: 10/610,760

(22) Filed: Jul. 2, 2003

(65) Prior Publication Data
US 2004/0036835 A1 Feb. 26, 2004

(30) Foreign Application Priority Data
Aug. 20, 2002 (KR) .................. 10-2002-0049192

(51) Int. Cl.$^7$ .......................... G02F 1/13; G02F 1/1343
(52) U.S. Cl. .................. 349/187; 139/147; 257/763; 257/765
(58) Field of Search .................. 349/187, 139, 349/147; 257/763, 765

(56) References Cited

U.S. PATENT DOCUMENTS

| | | | |
|---|---|---|---|
| 4,297,436 A | * 10/1981 | Kubotera et al. | 430/319 |
| 5,162,933 A | * 11/1992 | Kakuda et al. | 349/46 |
| 6,081,308 A | * 6/2000 | Jeong et al. | 349/42 |
| 6,225,150 B1 | * 5/2001 | Lee et al. | 438/153 |
| 6,296,975 B1 | * 10/2001 | Moon et al. | 430/5 |

* cited by examiner

Primary Examiner—Huyen Ngo
(74) Attorney, Agent, or Firm—Morgan Lewis & Bockius LLP

(57) ABSTRACT

A method for forming a line of an LCD device includes sequentially depositing first and second metal layers on a glass substrate, forming a mask pattern on the second metal layer, performing a first wet-etch process using a mixed acid solution as an etchant on the first and second metal layers with the mask pattern, and performing a second wet-etch process using the mask pattern.

24 Claims, 6 Drawing Sheets

METHOD FOR FORMING METAL LINE OF LIQUID CRYSTAL DISPLAY DEVICE

This application claims the benefit of the Korean Application No. P2002-49192 filed on Aug. 20, 2002, which is hereby incorporated by reference.

BACKGROUND OF THE INVENTION

1. Field of the Invention

The present invention relates to a liquid crystal display (LCD) device, and more particularly, to a method for forming a dual-layered metal line of molybdenum Mo/aluminum Al for an LCD device.

2. Discussion of the Related Art

In general, demand for various display devices has been steadily increasing. Accordingly, significant efforts have been made to research and develop various flat display devices such as liquid crystal display (LCD), plasma display panel (PDP), electroluminescent display (ELD), and vacuum fluorescent display (VFD). Various types of flat display devices are already currently in use.

Among the various flat display devices, the liquid crystal display (LCD) device has been most widely used due to advantageous characteristics such as thinness, light weight, and low power consumption. Accordingly, LCD devices are increasingly replacing cathode ray tubes (CRT). In addition to the mobile type LCD devices such as a display for a notebook computer, LCD devices have been developed for computer monitors, televisions receivers and information displays.

Despite various technical developments in the LCD technology with applications in different fields, research in enhancing the picture quality of an LCD device has been lacking in some respects as compared to other features and advantages of the LCD device. The key to developing the LCD device as a general display device in various fields lies on whether the LCD device can yield a high quality picture, such as high resolution and high luminance with a large-sized screen while still maintaining light weight, thinness, and low power consumption.

A typical LCD device includes an LCD panel for displaying a picture image, and a driving part for applying a driving signal to the LCD panel. Moreover, the LCD panel includes first and second substrates bonded to each other at a predetermined distance, and a liquid crystal layer between the first and second substrates. In this instance, the first substrate (TFT array substrate) comprises a plurality of gate lines arranged in one direction at fixed intervals, a plurality of data lines arranged at fixed intervals perpendicular to the plurality of gate lines, a plurality of pixel electrodes forming a matrix in which respective pixel regions are defined by the intersection of the plurality of gate and data lines, and a plurality of thin film transistors being switched by signals from the gate lines for transmitting signals from the data lines to the respective pixel electrodes. In addition, the second substrate (color filter array substrate) includes a black matrix layer for preventing light from reaching portions of the first substrate other than the pixel regions, and R/G/B color filter layer for displaying various colors, and a common electrode for displaying an image.

The LCD device is driven in accordance with an optical anisotropy and a polarizability of the liquid crystal. Specifically, liquid crystal molecules are aligned in accordance with directional characteristics due to the liquid crystal molecules having respectively long and thin shapes. In this respect, an electric field is applied to the liquid crystal for controlling an alignment direction of the liquid crystal molecules. Specifically, if the alignment direction of the liquid crystal molecules is controlled by the electric field, light is refracted along the alignment direction in accordance with the optical anisotropy of the liquid crystal, thereby displaying the image.

In a typical LCD device, the gate line or the data line is formed not as a single-layered structure of an aluminum Al layer, but as a dual or three-layered structure by depositing a molybdenum Mo layer or a chrome Cr layer (or molybdenum Mo) on or under the aluminum Al layer to prevent a signal delay from being generated between the lines or electrodes due to a coupling capacitance. Even though the gate or data line is formed of aluminum Al having great resistance characteristics, aluminum Al has a weak corrosion resistance to chemicals. Accordingly, when forming the gate or data line as an aluminum Al layer, it is hard to control an etch rate during an etching process. Moreover, an aluminum gate and data line may be easily oxidized, thereby causing rupture of the lines. Thus, the molybdenum Mo layer is deposited on the aluminum Al layer since molybdenum Mo has a greater corrosion resistance to chemicals, thereby preventing direct contact between the aluminum Al layer and the chemicals. If the gate or data line is formed with the dual-layer structure of the aluminum Al layer and the molybdenum Mo layer, the line is patterned using a wet-etch process. In this instance, the aluminum Al has higher etch rate than the molybdenum Mo. Accordingly, an overhang is generated in the molybdenum Mo layer on the aluminum Al layer in accordance with a Galvanic Corrosion phenomenon.

Hereinafter, a method forming a line of an LCD device in accordance with the related art will be described as follows.

Figure 1A:
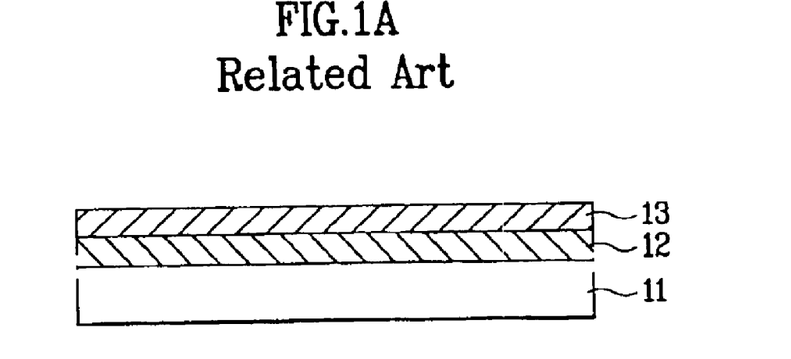
FIG. 1A is a cross-sectional view illustrating a method for forming a line of an LCD device according to the related art.

FIG. 1A is a cross-sectional view illustrating a method for forming a line of an LCD device according to the related art. As shown in FIG. 1A, an aluminum Al layer 12 and a molybdenum Mo layer are sequentially deposited on a glass substrate 11. In this instance, the aluminum Al layer is formed with a thickness of 10 Angstroms to 3000 Angstroms, and the molybdenum Mo layer 13 is formed with a thickness of 10 Angstroms to 2000 Angstroms.

Figure 1B:
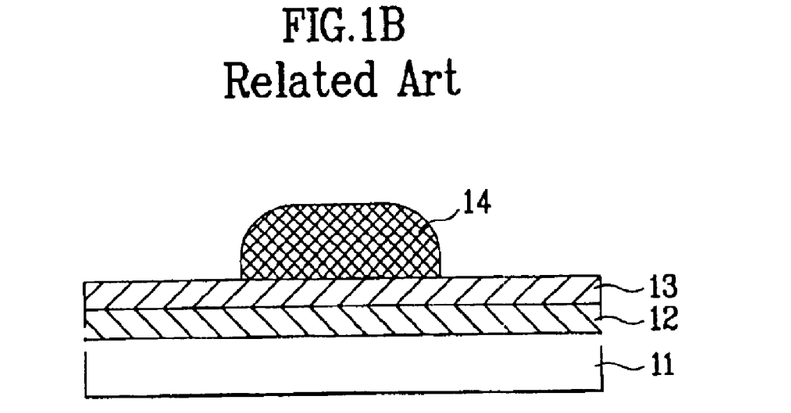
FIG. 1B is a cross-sectional view illustrating a method for forming a line of an LCD device according to the related art.

FIG. 1B is a cross-sectional view illustrating the method for forming a line of an LCD device according to the related art. As shown in FIG. 1B, a photoresist layer is deposited on an entire surface of the molybdenum Mo layer 13, and an exposure and developing process is performed thereon using a mask, thereby forming a photoresist pattern 14 on a predetermined portion of the molybdenum Mo layer 13.

Figure 1C:
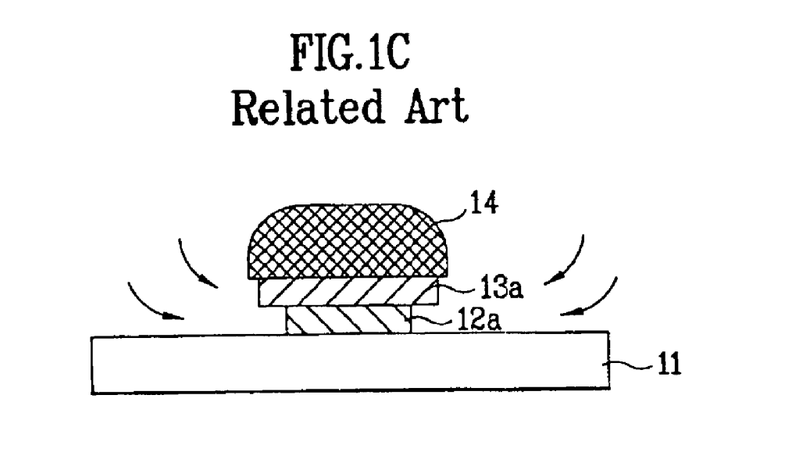
FIG. 1C is a cross-sectional view illustrating a method for forming a line of an LCD device according to the related art.

FIG. 1C is a cross-sectional view illustrating the method for forming a line of an LCD device according to the related art. Referring to FIG. 1C, a wet-etch process of a spraying method is performed using the photoresist pattern 14 as a mask, whereby the molybdenum Mo layer 13a and the aluminum Al layer 12a are selectively removed to form a metal line pattern. In the wet-etch process, an etchant is formed of a mixed acid solution containing a ratio of 30% to 70% of phosphoric acid, 2% to 30% of nitric acid and 1% to 20% of acetic. In addition, a small amount of an additive may be added to the etchant.

Following the wet-etch process, an overhang is generated in the molybdenum Mo layer 13a in accordance with a potential difference due to a Galvanic Corrosion phenomenon between the molybdenum Mo layer 13a and the aluminum Al layer 12a. According to the Galvanic Corrosion phenomenon, if two metal layers having different electrochemical characteristics are dipped into a conductive etchant, and the two metal layers are electrically connected to each other, the lower metal layer behaves as an anode. Accordingly, the lower metal layer is first ionized. Specifically, the two metal layers have different etch rate with respect to the same etchant. Accordingly, an additional process is required to remove the overhang of the molybdenum layer 13a following the wet-etch process.

Figure 1D:
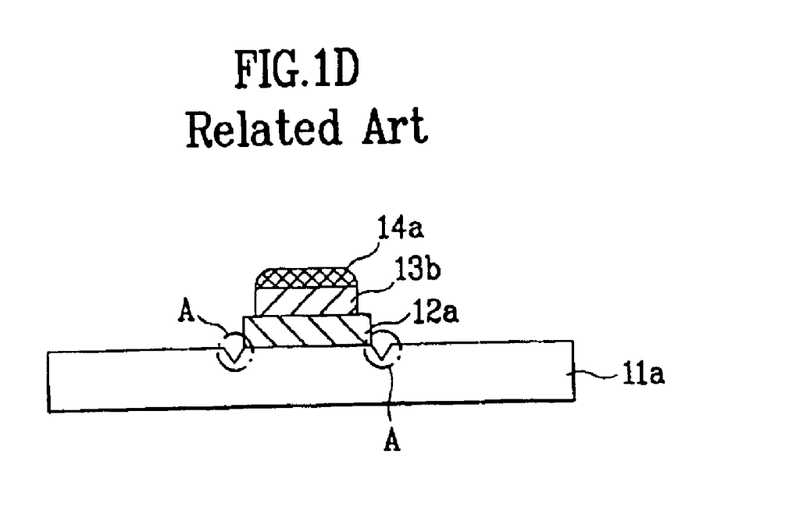
FIG. 1D is a cross-sectional view illustrating a method for forming a line of an LCD device according to the related art.

FIG. 1D is a cross-sectional view illustrating the method for forming a line of an LCD device according to the related art. As shown in FIG. 1D, an ashing process is applied to the photoresist pattern 14a to decrease the size of the photoresist pattern 14a. In addition, a dry-etch process is performed to remove the overhang of the molybdenum Mo layer 13a. The dry-etch process uses an etchant of fluorine such as $SF_6$, thereby forming a line of the aluminum Al layer and the molybdenum Mo layer 12a and 13a having a stepwise profile. In this case, as shown in portions A of FIG. 1D, the glass substrate 11 suffers from etch damages along the circumference of the line 12a and 13a due to the etchant used in the dry-etch process.

Figure 1E:
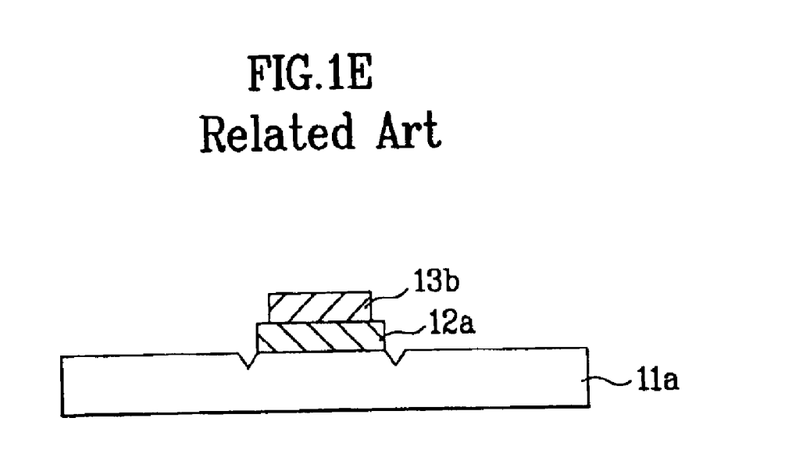
FIG. 1E is a cross-sectional view illustrating a method for forming a line of an LCD device according to the related art.

FIG. 1E is a cross-sectional view illustrating the method for forming a line of an LCD device according to the related art. Referring to FIG. 1E, the process for forming the dual line of the aluminum Al/molybdenum Mo 12a and 13a according to the related art is completed by removing the photoresist pattern.

Figure 2:
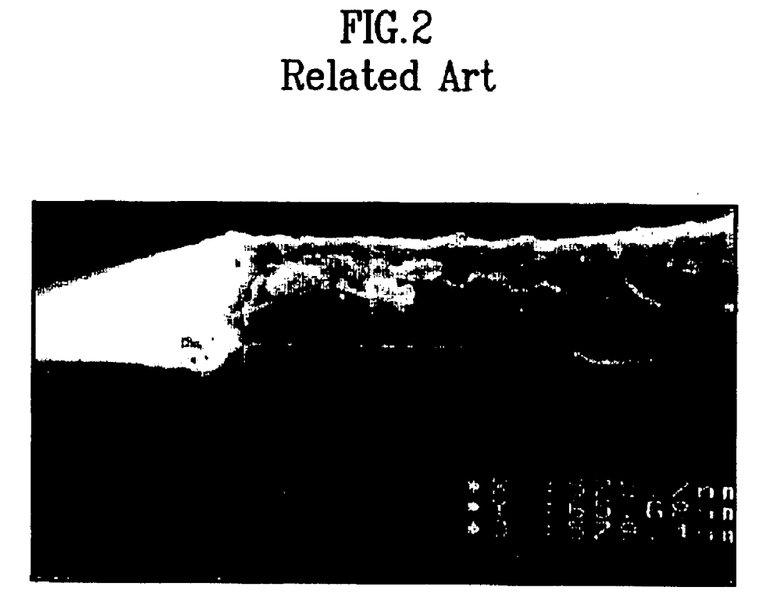
FIG. 2 is an SEM view illustrating a line and a substrate of an LCD device according to the related art.

FIG. 2 is an SEM view illustrating a line and a substrate of an LCD device according to the related art.

The related art method for forming a line of the LCD device has the following disadvantages. As mentioned above, the dry-etch process is performed with an etchant of fluorine such as $SF_6$ in order to remove the overhang of the molybdenum Mo layer. However, as shown in portions A of FIG. 1D, the glass substrate is etched at the portion corresponding to the circumference of the aluminum Al layer with a thickness of 660 Angstroms during the anisotropic dry-etch process. Specifically, the glass substrate is differently damaged in accordance with a size of the overhang of the molybdenum Mo layer. As the overhang of the molybdenum Mo layer increases, the glass substrate is significantly damaged. Accordingly, if the glass substrate of the LCD device having the dual-layered line structure is significantly damaged, the LCD device may eventually fail in a rework process, or the rework process may be complicated.

SUMMARY OF THE INVENTION

Accordingly, the present invention is directed to a method for forming a line of an LCD device that substantially obviates one or more problems due to limitations and disadvantages of the related art.

An object of the present invention is to provide a method for forming a line of an LCD device to prevent damaging a glass substrate while removing an overhang.

Another object of the present invention is to provide a method for forming a dual-layered metal line of an LCD device that substantially reduces an overhang of one metal line with respect to another.

Another object of the present invention is to provide a method for forming a dual-layered metal line of an LCD device having a tapered profile.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these objects and other advantages and in accordance with the purpose of the invention, as embodied and broadly described herein, the method for forming a line of an LCD device includes sequentially depositing first and second metal layers on a glass substrate, forming a mask pattern on the second metal layer, performing a first wet-etch process using a mixed acid solution as an etchant on the first and second metal layers with the mask pattern; and performing a second wet-etch process using the mask pattern.

In another aspect, the method for forming a line of an LCD device includes sequentially depositing first and second metal layers on a glass substrate, forming a mask pattern on the second metal layer, performing a first wet-etch process to the first and second metal layers with a mixed acid solution to form an overhang structure using the mask pattern, and removing an overhang portion of the second metal layer in a second wet-etch process using the mask pattern.

In another aspect, the method for forming a line of an LCD device includes depositing a first metal layer on a glass substrate, depositing a second metal layer on the first metal layer, forming a mask pattern on the second metal layer, performing a first wet-etch process by applying a first etchant to an exposed portion of the second metal layer and the first metal layer underneath in accordance with the mask pattern, thereby forming an overhang portion of the second metal layer, and performing a second wet-etch process to remove the overhang portion of the second metal layer by applying a second etchant to the first and second metal layers.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 3A:
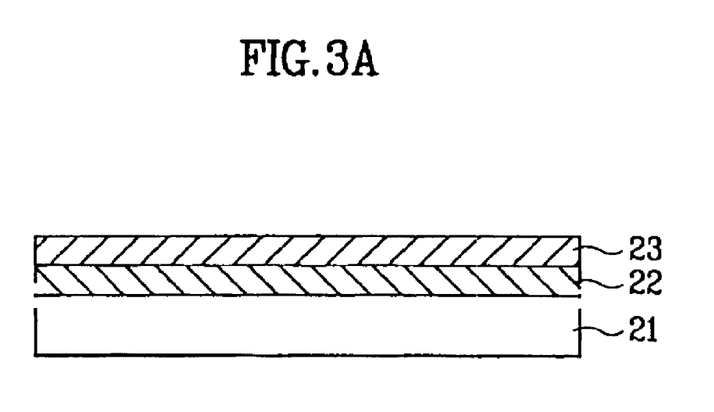
FIG. 3A is an exemplary cross-sectional view illustrating a method for forming a line of an LCD device in accordance with the present invention.

FIG. 3A is an exemplary cross-sectional view illustrating a method for forming a line of an LCD device in accordance with the present invention. As shown in FIG. 3A, an aluminum (pure aluminum) Al layer 22 or an aluminum alloy (AlNd) layer 22, and a molybdenum Mo layer 23 may sequentially be deposited on a glass substrate 21. In this instance, the aluminum Al layer 22 may be formed with a thickness of 10 Angstroms to 3000 Angstroms, and the molybdenum Mo layer 23 may be formed with a thickness of 10 Angstroms to 2000 Angstroms.

Figure 3B:
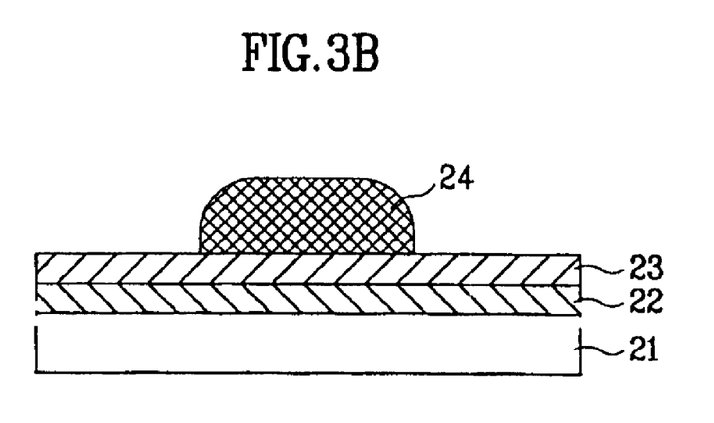
FIG. 3B is an exemplary cross-sectional view illustrating a method for forming a line of an LCD device in accordance with the present invention.

FIG. 3B is an exemplary cross-sectional view illustrating a method for forming a line of an LCD device in accordance with the present invention. As shown in FIG. 3B, a photoresist layer may be deposited on an entire surface of the molybdenum Mo layer 23, and an exposure and developing process may be performed thereon using a mask (not shown) to form a line, thereby forming a photoresist pattern 24 on a predetermined portion of the molybdenum Mo layer 23.

Figure 3C:
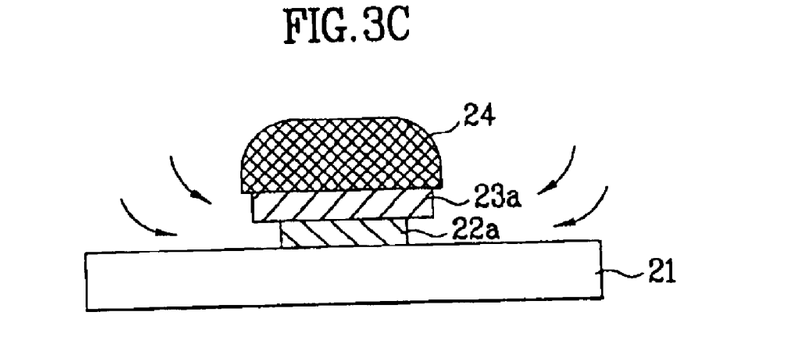
FIG. 3C is an exemplary cross-sectional view illustrating a method for forming a line of an LCD device in accordance with the present invention.

FIG. 3C is an exemplary cross-sectional view illustrating a method for forming a line of an LCD device in accordance with the present invention. Referring to FIG. 3C, the molybdenum Mo layer 23a and the aluminum Al layer 22a are selectively removed using the photoresist pattern 24 as a mask. In this instance, the molybdenum Mo layer 23a and the aluminum Al layer 22a may be removed by performing a wet-etch process. In the wet-etch process, an etchant may be formed by adding 30% to 70% of phosphoric acid, 2% to 30% of nitric acid, and 1% to 20% of acetic acid to deionized water (D.I.). In addition, a small amount of an additive may be added to the etchant. After completing the wet-etch process, an overhang may be generated in a profile of the molybdenum Mo layer 23a in accordance with a potential difference due to a Galvanic Corrosion phenomenon between the molybdenum Mo layer 23a and the aluminum Al layer 22a.

Figure 3D:
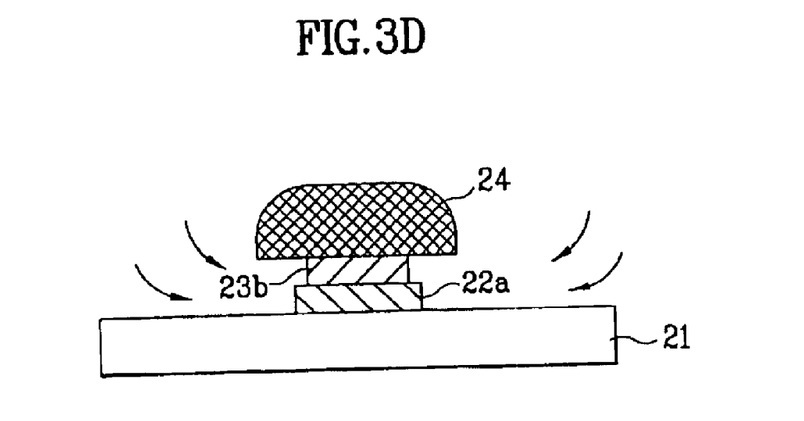
FIG. 3D is an exemplary cross-sectional view illustrating a method for forming a line of an LCD device in accordance with the present invention.

FIG. 3D is an exemplary cross-sectional view illustrating a method for forming a line of an LCD device in accordance with the present invention. As shown in FIG. 3D, a second wet-etch process may be additionally performed to remove the overhang of the molybdenum Mo layer 23b resulting from the first wet-etch process. In the second wet-etch process, it may be required to use an etchant having high etch rate with respect to the molybdenum Mo layer, and having a negligibly low etch rate with respect to the aluminum Al layer. Accordingly, it may be possible to prevent the Galvanic Corrosion phenomenon from being generated between the molybdenum Mo layer and the aluminum Al layer. For example, oxygenated water $H_2O_2$ or ceric ammonium nitride C. A. N. may be used as the etchant in the second wet-etch process. Accordingly, after performing the first wet-etch process by applying the mixed acid solution to the dual-layered line of the aluminum/molybdenum, the second wet-etch process may be performed by applying $H_2O_2$ or C. A. N. solution thereto to remove the overhang of the upper molybdenum 23b layer. In this instance, it may be possible to prevent damages to the lower aluminum Al layer 22a. As a result, the dual-layered line of the aluminum/molybdenum may be patterned in a normal taper shape.

The C. A. N. solution may be formed by adding $Ce(NH_4)_2(NO_3)_6$ and nitric acid to D. I. water at a ratio of 1–30wt % and 1–50wt %, respectively. During the second wet-etch process, the etchant may be provided at a fixed ratio. Especially, it may be most effective to form the C. A. N. solution by adding 10 wt % of $Ce(NH_4)_2(NO_3)_6$ and 16 wt % of nitric acid to D. I. water. In this instance, the second wet-etch process may be performed by sequentially adding the two etchants within the same chamber used in the first wet-etch process. Alternatively, the second wet-etch process may be performed in a different chamber from that used in the first wet-etch process using the mixed acid solution.

Figure 3E:
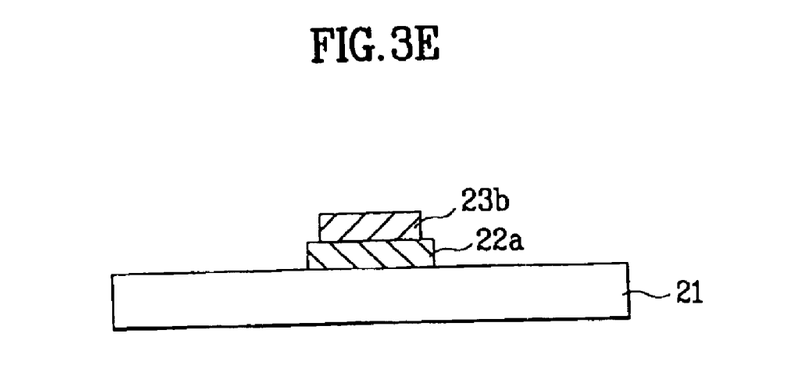
FIG. 3E is an exemplary cross-sectional view illustrating a method for forming a line of an LCD device in accordance with the present invention.

FIG. 3E is an exemplary cross-sectional view illustrating a method for forming a line of an LCD device in accordance with the present invention. Referring to FIG. 3E, the remaining photoresist pattern may be removed to form the dual-layered line of the aluminum Al layer 22a and the molybdenum Mo layer 23b having a stepwise difference. The aforementioned method for forming a dual-layered line of the molybdenum and aluminum layers of the LCD device in accordance with the present invention may be applicable to methods for forming gate and data lines.

Figure 4:
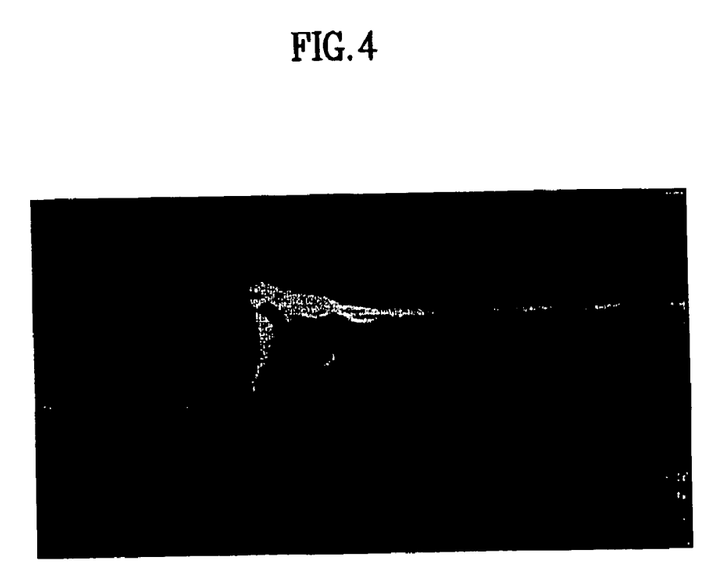
FIG. 4 is an exemplary SEM view illustrating a line and a substrate of an LCD device according to the present invention.

FIG. 4 is an exemplary SEM view illustrating a line and a substrate of an LCD device according to the present invention. Referring to FIG. 4, the dual-layered line of the aluminum Al and molybdenum Mo layers of the LCD device in accordance with the present invention may be formed in the normal tapered shape by removing the overhang of the molybdenum Mo layer, whereby it may be possible to prevent the glass substrate corresponding to a circumference of the dual-layered line from being etched. The aforementioned method using the wet-etch process in accordance with the present invention may be applicable to the method for forming a gate line on the glass substrate, or for forming a data line perpendicular to the gate line with an insulating layer interposed therebetween.

As mentioned above, the method for forming the line of the LCD device in accordance with the present invention has the following advantages. In the related art method for forming the line of the LCD device, a dry-etch process is performed to remove the overhang of the molybdenum Mo layer, whereby the glass substrate may be largely etched along a circumference of the line. However, in the method for forming the line of the LCD device in accordance with the present invention, a wet-etch process may be performed to remove the overhang of the molybdenum Mo layer instead of the dry-etch process of the related art, thereby preventing the glass substrate from being etched along the circumference of the line.

The first and second wet-etch processes may be performed within the same chamber by changing the etchant, whereby the line may be formed in the wet-etch process. Thus, an expensive dry etch equipment may be not required in the method for forming a line of the LCD device in accordance with the present invention. Accordingly, it may be possible to manufacture the LCD device at a low price.

In the method for forming a line of the LCD device in accordance with the present invention, the wet-etch process may be performed to remove the overhang of the molybdenum Mo layer, thereby preventing the glass substrate along the circumference of the line from being etched. Thus, it may be possible to smoothly perform a rework process without degradation of the LCD device.

It will be apparent to those skilled in the art that various modifications and variations can be made in the method for forming metal line of liquid crystal display device. Thus, it is intended that the present invention covers the modifications and variations of this invention provided they come within the scope of the appended claims and their equivalents.

What is claimed is:

1. A method for forming a line of an LCD device, comprising:

sequentially depositing first and second metal layers on a glass substrate;

forming a mask pattern on the second metal layer;

performing a first wet-etch process using a mixed acid solution as an etchant on the first and second metal layers with the mask pattern; and performing a second wet-etch process using the mask pattern.

2. The method of claim 1, wherein the first metal layer is an aluminum Al layer, and the second metal layer is a molybdenum Mo layer.

3. The method of claim 2, wherein the mixed acid solution is formed by adding phosphoric acid, nitric acid, and acetic acid to D. I. (deionized) water at a ratio of 63 to 66 wt %, 5 to 6 wt %, and 13 wt %, respectively.

4. The method of claim 2, wherein an etchant of the second wet-etch process includes oxygenated water $H_2O_2$.

5. The method of claim 2, wherein an etchant of the second wet-etch process is formed of by adding $Ce(NH_4)_2(NO_3)_6$ and nitric acid to D. I. water at a ratio of 1–30 wt % and 1–50 wt %, respectively.

6. The method of claim 2, wherein an etchant of the second wet-etch process is formed of by adding $Ce(NH_4)_2(NO_3)_6$ and nitric acid to D. I. water at a ratio of 10 wt % and 6 wt %, respectively.

7. The method of claim 2, wherein the mask pattern includes a photoresist pattern.

8. A method for forming a line of an LCD device, comprising:

sequentially depositing first and second metal layers on a glass substrate;

forming a mask pattern on the second metal layer;

performing a first wet-etch process to the first and second metal layers with a mixed acid solution to form an overhang structure using the mask pattern; and removing an overhang portion of the second metal layer in a second wet-etch process using the mask pattern.

9. The method of claim 8, wherein the first metal layer is an aluminum Al layer, and the second metal layer is a molybdenum Mo layer.

10. The method of claim 9, wherein the mixed acid solution is formed by adding phosphoric acid, nitric acid, and acetic acid to D. I. (deionized) water at a ratio of 63 to 66 wt %, 5 to 6 wt %, and 13 wt %, respectively.

11. The method of claim 9, wherein an etchant of the second wet-etch process includes oxygenated water $H_2O_2$.

12. The method of claim 9, wherein an etchant of the second wet-etch process is formed of by adding $Ce(NH_4)_2(NO_3)_6$ and nitric acid to D. I. water at a ratio of 1–30 wt % and 1–50 wt %, respectively.

13. The method of claim 9, wherein an etchant of the second wet-etch process is formed of by adding $Ce(NH_4)_2(NO_3)_6$ and nitric acid to D. I. water at a ratio of 10 wt % and 16 wt %.

14. The method of claim 9, wherein the mask pattern includes a photoresist pattern.

15. A method for forming a line of an LCD device, comprising the steps of:

depositing a first metal layer on a glass substrate;

depositing a second metal layer on the first metal layer;

forming a mask pattern on the second metal layer;

performing a first wet-etch process by applying a first etchant to an exposed portion of the second metal layer and the first metal layer underneath in accordance with the mask pattern, thereby forming an overhang portion of the second metal layer; and performing a second wet-etch process to remove the overhang portion of the second metal layer by applying a second etchant to the first and second metal layers.

16. The method of claim 15, wherein an etch rate of the second metal layer by the second etchant is higher than an etch rate of the first metal layer by the second etchant.

17. The method of claim 16, wherein the first metal layer includes aluminum Al, and the second metal layer includes molybdenum Mo.

18. The method of claim 17, wherein the second etchant includes oxygenated water $H_2O_2$.

19. The method of claim 17, wherein the second etchant is formed by adding $Ce(NH_4)_2(NO_3)_6$ and nitric acid to D. I. water at a ratio of 1–30 wt % and 1–50 wt %, respectively.

20. The method of claim 17, wherein the second etchant is formed by adding $Ce(NH_4)_2(NO_3)_6$ and nitric acid to D. I. water at a ratio of 10 wt % and 16 wt %, respectively.

21. The method of claim 15, wherein the first metal layer includes aluminum Al, and the second metal layer includes molybdenum Mo.

22. The method of claim 15, wherein the second etchant is formed by adding $Ce(NH_4)_2(NO_3)_6$ and nitric acid to D. I. water at a ratio of 1–30 wt % and 1–50 wt %, respectively.

23. The method of claim 15, wherein the second etchant is formed by adding $Ce(NH_4)_2(NO_3)_6$ and nitric acid to D. I. water at a ratio of 10 wt % and 16 wt %, respectively.

24. The method of claim 15, wherein the first etchant is a mixed acid solution formed by adding 63 to 66 wt % of phosphoric acid, 5 to 6 wt % of nitric acid and 13 wt % of acetic acid to D. I. (deionized) water.

* * * * *